Aug. 29, 1967    E. W. LAMPE    3,338,122
APPARATUS FOR MAKING INSULATION PIPE COVERING
Filed Oct. 13, 1965    2 Sheets-Sheet 1
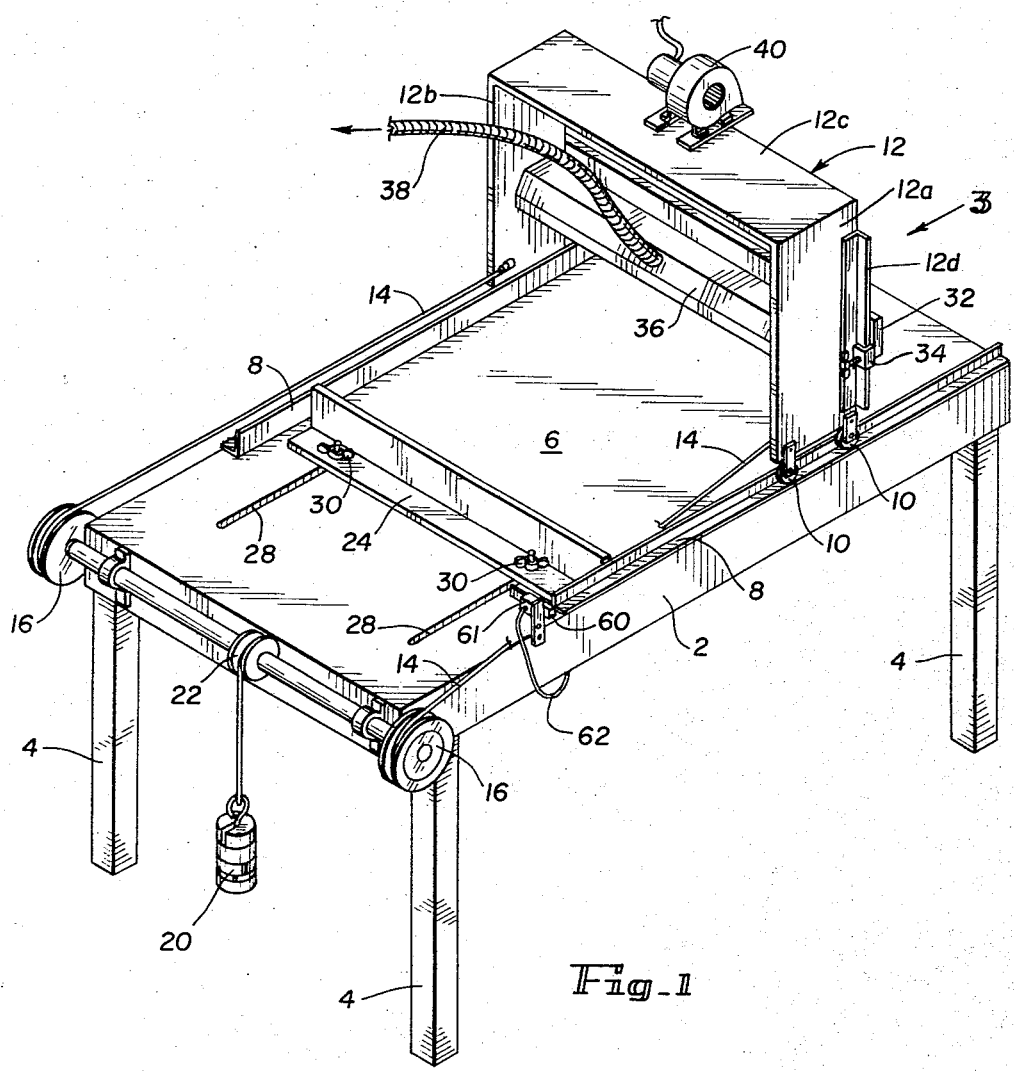
Fig_1
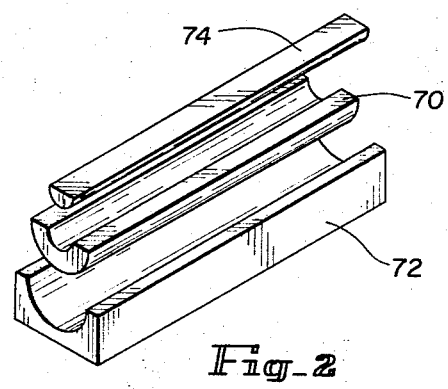
Fig_2
INVENTOR.
EDGAR W. LAMPE
BY
Richard D. Law
ATTORNEY Aug. 29, 1967  E. W. LAMPE  3,338,122
APPARATUS FOR MAKING INSULATION PIPE COVERING
Filed Oct. 13, 1965  2 Sheets-Sheet 2

INVENTOR.
EDGAR W. LAMPE
BY
Richard D. Law
ATTORNEY

United States Patent Office 3,338,122
Patented Aug. 29, 1967

3,338,122
APPARATUS FOR MAKING INSULATION
PIPE COVERING
Edgar W. Lampe, 6536 S. Lincoln St.,
Littleton, Colo. 80120
Filed Oct. 13, 1965, Ser. No. 495,600
6 Claims. (Cl. 83—5)

This invention relates to apparatus for making insulation pipe covering from blocks of foamed expanded or cellular plastics and elastomers.

Foamed plastics and elastomers, particularly thermoplastic elastomers which are expanded, foamed or gasified, that is, having either an open cell or a closed cell structure, have been found to provide excellent insulation for all types of pipes. Commonly available expanded materials include polystyrene, polyethylene, polyurethanes, plasticized polyvinyl chlorides, etc. These thermoplastic materials are readily cut by hot wires, knives, and the like, and the present invention provides an economical process for producing pipe insulation covering from blocks of the expanded material.

In general, the equipment of the invention includes a frame on which a block of the foamed plastic may be fixed and a cutter moved in a single plane through the plastic. The block is held and one or more pairs of heated semicircular cutting wires are moved with constant pressure against the block to cut an insulation section from the block. To provide the uniform pressure on the block by the cutting wires, a weight is suspended over the end of the frame, pulling a cutting wire support against the block of plastic. A superstructure is reciprocally mounted on the frame above the block and the weight is arranged to bias the superstructure toward the block with a uniform pressure and the cutting wires bear against the block.

Included among the objects and advantages of the present invention is apparatus for quickly and economically cutting insulating covering for pipes from expanded plastic material. The device includes at least one pair of heated cutting members shaped to one-half of the inside and outside configuration of the insulation, and the cutting members are then pulled with a uniform pressure through a block of expanded plastic to economically and effectively cut the insulation part from the block. The device is arranged with a movable superstructure which is biased with a uniform pressure against a block of foamed or expanded material. The cutting members are mounted on the superstructure so as to be easily changed permitting a ready change in the size and shape of the insulation to be cut.

These and other objects and advantages of the invention may be readily ascertained by referring to the following description and appended illustrations in which:

FIG. 1 is a general perspective view of an insulating cutting apparatus according to the invention;

FIG. 2 is a perspective of the configuration of the cut foamed material showing the various parts which have been removed from a block;

Figure 3:
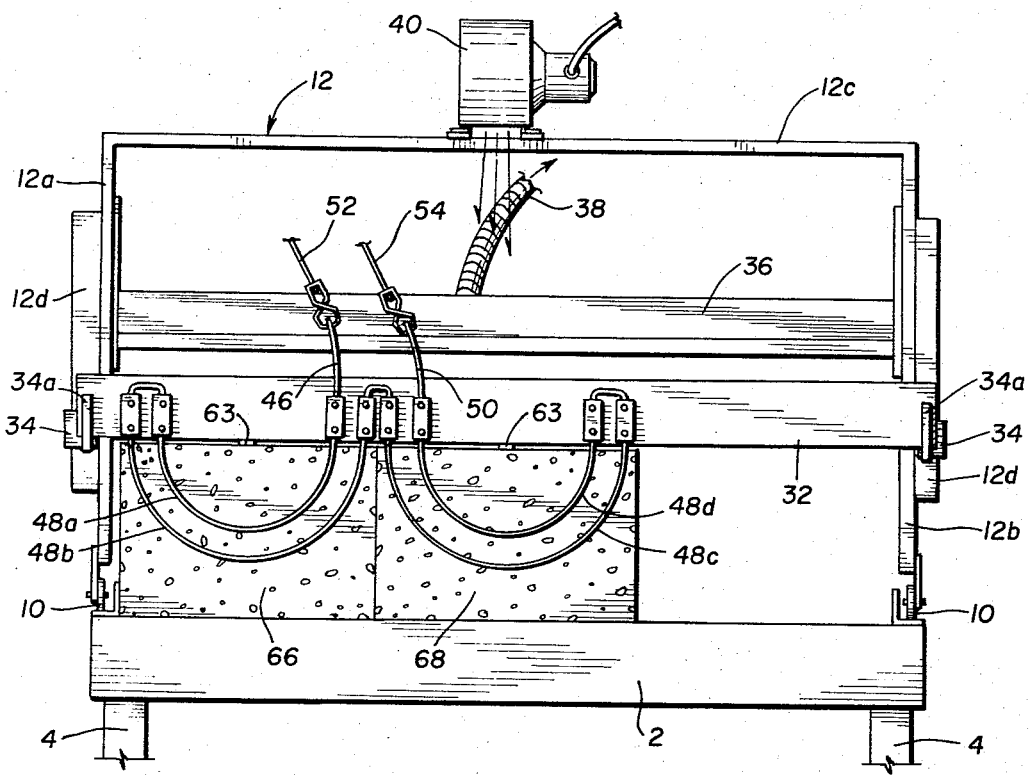
FIG. 3 is a front elevational view of a portion of the apparatus illustrating the cutting members for forming the insulation.
Figure 5:
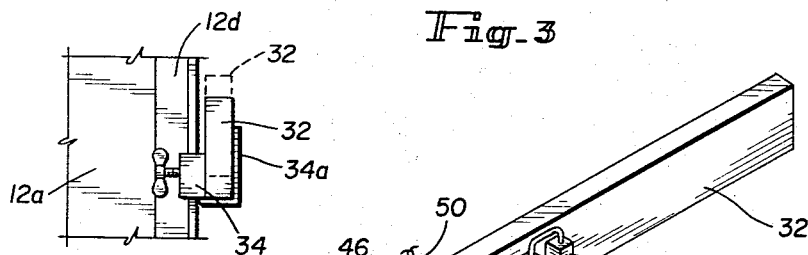

The device illustrated includes a planar table or frame 2 supported by uprights 4 to provide a generally horizontal surface 6 on which is supported a block of foamed or expanded plastic. An angle track 8 is mounted at each side of the table to support rollers 10 of a superstructure 12 which is a generally U-shaped member arranged to reciprocate in the tracks 10. The superstructure 12 is moved along the track by means of a weight turning a shaft having pulleys over which is wound a line from each side of the superstructure. This provides a uniform pressure of cutting members on the superstructure against the block of plastic. A line 14 attached to each side of the superstructure passes over one of the pulleys 16 mounted on both ends of a shaft 18. A weight 20 is attached to a line which reels and unreels on a spool 22, and the weight tends to rotate the shaft 18 which in turn rotates the pulleys 16. This action tends to bias the superstructure toward the shaft. A block stop 24, which is generally an angle, is mounted so that it may be positioned along grooves 28 by means of movable thumb screws 30 which slide in the grooves. In this manner, the stop 24 may be pre-positioned on the table depending on the size of block to be cut. The superstructure includes uprights 12a and 12b and an overhead connector 12c. A removable cutter bar 32 rests in upright members 34a of clamps 34 mounted on angles 12d mounted on the uprights on each side of the superstructure. This provides a height positioning for the cutters as explained below, and permits the cross bar to raise in the event of arched or uneven blocks of plastic. An exhaust hood 36 is provided with a conduit 38 to a blower (not shown) for removing gases which may be formed by the cutting operation. A blower 40 mounted on the superstructure provides cooling air adjacent to the cutters for providing some cooling for the exposed portions of the heated wires and their holding heads.

Figure 4:
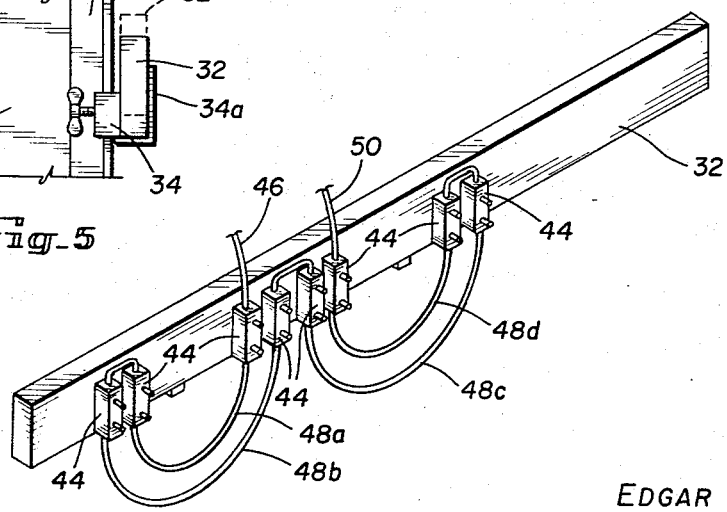
FIG. 4 is a perspective view of a mounting device for the hot wire cutting apparatus of the invention.

The cutting wires are mounted on the cross bar 32 by means of a series of clamps 44 spaced along the bar in position to support the electrical heated wiring used for cutting the block. In FIGS. 3 and 4 there are shown two sets of cutting wires arranged to cut one larger or two smaller blocks as is shown in FIG. 3. In this case the wire is attached to a lead 46 and a loop 48a extends from one clamp to another clamp and the configuration of the loop is semicircular to form the inside of a half of a full pipe insulation. The outside of the half is formed by a loop 48b, which is a continuation of the wire extending through the clamps at the left end of the bar, and it likewise is a semicircular configuration. The loop 48c is formed by the wire extending through the righthand clamps of the left loops and into the lefthand clamps of the right loops. This is the outside cutter for the next adjacent block. The loop 48c is, likewise, a semicircular loop and its wire extends through the holder clamps reversing and extending back to form an inside loop 48d, of a semicircular form. This end of cutter wire is attached to a lead 50. By making the cutting wires from a single wire, only two leads are necessary for a configuration of the two blocks. It is noted that the cross bar is arranged for an additional cutter wire or additional loops of the same wire so that three blocks of the size shown may be cut at the same time.

The number of cutters that may be placed across the cross bar is determined by the size of the insulation being cut. Generally, the smaller the insulation, the more cutters may be placed side by side along the cross beam and the more pieces of insulation may be cut from each operation.

The power lines 52 and 54 are connected by clamps to the leads 46 and 50 and the power line conductors are then run to a rheostat (not shown) as is conventional. Some slack, of course, is required in the cables 52 and 54 since the superstructure moves along the table.

To arrest the movement of the superstructure, a mechanical stop 60 is provided on each side of the table to physically stop the superstructure. A microswitch 61, connected by means of wires 62 to a rheostat, the connection not being shown, is arranged to cut off the current to the cutting wires when the superstructure reaches the end of its run, at which time the cutter wires have penetrated the block from end to end.

In operation, as shown in FIG. 3, a block of foamed plastic 66 is mounted on the left side of the table with a block of foamed plastic 68 adjacent thereto in position to be contacted by the heated wires 48a through 48c. The superstructure is permitted to move under the influence of the weight so that the wires bear against the blocks. The wires are heated to a temperature sufficient to melt and the weight 20 provides pressure so that the wires move through the material as it is melted or otherwise parted. The wires bear against the block through the length of the block at a substantially uniform pressure. In this manner, a piece of a half of pipe insulation 70, shown in FIG. 2, is cut from the block which leaves a grooved block 72 and a half of cylinder 74. Various uses may be made of the other parts of the block after the pipe insulation path is cut from the block. A spacer 63, FIG. 3, is mounted on the cross bar and rests on the plastic, maintaining a uniform portion of the cutters in the plastic.

As soon as the blocks on the table have been cut, the material is removed and the superstructure moved back to the opposite end of the table, and new blocks placed in position resting against the stop 24. It is not necessary to clamp the expanded block on the table since the superstructure actually holds the blocks in position. Particularly when the table is filled with blocks, there is no likelihood of lateral movement; when less than the full number of blocks are used side rails may, of course, be provided to keep the blocks in position as the cutting wires are drawn through the block. The uniform pressure produces a smooth, uniform cut preventing charring of the material by too long a residence time of the wire on any particular part of the expanded material.

While the invention has been illustrated by reference to a particular device, there is no intent to limit the spirit or scope of the invention to precise details so set forth except as defined in the following claims.

I claim:

1. Apparatus for cutting one-half of a tubular pipe insulation from a block of foamed plastic or the like comprising a planar frame arranged to support at least one rectangular block of foamed plastic; stop means adjacent one end of said frame arranged to prevent movement of a block of plastic in one direction; a U-shaped superstructure mounted for reciprocating movement on said planar frame toward and away from said stop means; at least one pair of cutter wires mounted on said superstructure arranged to contact a block supported on said frame; said at least one pair of wires including an inner cutter wire of semicircular configuration and an outer cutter wire of semicircular configuration juxtaposed with said inner cutter wire; means for impressing a current on said cutter wires to heat the same; stop means for said superstructure adjacent said stop means for said block; and weight means arranged to uniformly pull said superstructure in its travel toward said stop means so as to apply uniform pressure of said cutter wires through said block.

2. Apparatus according to claim 1 in which a circuit breaker is associated with said stop means for disrupting the current to said cutter wires as said superstructure approaches said stop means.

3. Apparatus for cutting one-half of a tubular pipe insulation from a block of foamed plastic or the like comprising a planar frame arranged to support at least one rectangular block of foamed plastic and having track means at each side thereof; stop means adjacent one end of said frame arranged to prevent movement of a block of plastic in one direction; a wheeled U-shaped superstructure mounted for reciprocating movement on said planar frame toward and away from said stop means; at least one pair of cutter wires mounted on said superstructure arranged to contact a block supported on said frame; said at least one pair of wires including an inner cutter wire of semicircular configuration and an outer cutter wire of semicircular configuration substantially concentric with and juxtaposed with said inner cutter wire; means for impressing a current on said cutter wires to heat the same; stop means for said superstructure adjacent said stop means for said block; and weight means arranged to uniformly pull said superstructure in its travel toward said stop means so as to apply uniform pressure of said cutter wires through said block.

4. Apparatus according to claim 3 wherein said weight means includes a shaft having a central reel and cable support weight secured to said central reel and arranged to bias said shaft for rotation, and a line mounted on each leg of said superstructure is attached to and windable on a reel secured to said shaft so as to bias said superstructure toward said shaft under the influence of said weight.

5. Apparatus according to claim 3 wherein a cross-bar is mounted for up and down movement on said superstructure, and the cutter wires are mounted on said cross-bar.

6. Apparatus according to claim 5 wherein a block is mounted on said cross-bar in position to rest on a plastic block so as to maintain a uniform position of said cutter wires in a held plastic block.

References Cited

UNITED STATES PATENTS

| | | | |
|---|---|---|---|
| 2,464,718 | 3/1949 | Potter et al. | 83—171 X |
| 3,117,211 | 1/1964 | Tansey | 83—171 |
| 3,199,388 | 8/1965 | Redfield | 83—171 |

ANDREW R. JUHASZ, *Primary Examiner.*